United States Patent [19]
Endo

[11] Patent Number: 5,684,601
[45] Date of Patent: Nov. 4, 1997

[54] IMAGE READING APPARATUS WHICH VARIES A NUMBER OF READING OPERATIONS ACCORDING TO IMAGE DENSITY

[75] Inventor: Azuchi Endo, Kanagawa, Japan

[73] Assignee: Fuji Photo Film Co., Ltd., Kanagawa, Japan

[21] Appl. No.: 689,126

[22] Filed: Jul. 30, 1996

Related U.S. Application Data

[62] Division of Ser. No. 163,700, Dec. 9, 1993, Pat. No. 5,568,270.

[30] Foreign Application Priority Data

Dec. 9, 1992 [JP] Japan .................................. 4-329525

[51] Int. Cl.⁶ ........................... H04N 1/40; H04N 1/04
[52] U.S. Cl. ...................... 358/298; 358/474; 358/486
[58] Field of Search .................................. 358/298, 474, 358/486

[56] References Cited

U.S. PATENT DOCUMENTS

| | | | |
|---|---|---|---|
| 4,521,805 | 6/1985 | Ayata et al. ........................... | 358/296 |
| 4,646,155 | 2/1987 | Miyazawa et al. ................. | 358/471 X |
| 4,899,226 | 2/1990 | Tamimoto et al. ................. | 358/433 X |
| 5,223,954 | 6/1993 | Miyakawa et al. ................. | 358/474 |

*Primary Examiner*—Eric Frahm
*Attorney, Agent, or Firm*—Sughrue, Mion, Zinn, Macpeak & Seas, PLLC

[57] ABSTRACT

An apparatus that reads the image on transmission-type originals includes a light source, a photoelectric transducer means for reading image information a necessary number of times in accordance with the image density, a memory for storing information read by the transducer, and an input device for entering the image information into the memory in accordance with image density information.

1 Claim, 6 Drawing Sheets

IMAGE READING APPARATUS WHICH VARIES A NUMBER OF READING OPERATIONS ACCORDING TO IMAGE DENSITY

This is a divisional of application Ser. No. 08/163,700 filed Dec. 9, 1993 now U.S. Pat. No. 5,568,270.

BACKGROUND OF THE INVENTION

The present invention relates to an image reading apparatus for reading the image of transmission-type originals such as negative films and reversal films. More particularly, the present invention relates to an image reading apparatus that is capable of reading images on such transmission-type originals with high efficiency and rapidity while assuring high precision of image reading.

One of the recent advances in image forming technology is the development of digital photoprinters in which image information recorded on photographic films such as negative films and reversal films is read photoelectrically and the image thus read is converted to a digital signal, which is then subjected to various image processing operations to produce recording image information and in which a light-sensitive material such as photographic paper is scan exposed with recording light that has been modulated in accordance with said image information, thereby producing finished prints.

With digital photoprinters, the layout of editing operations on printed images such as composing more than one image, dividing an image and editing both characters and images, as well as various image processing operations such as color/density adjustment, scaling and edge enhancement can be performed freely so as to produce finished prints that have been freely edited and an image processed in accordance with the intended use.

It should also be noted that compared to conventional a really exposed prints, not all of the image density information that is recorded on films can be reproduced for various reasons associated with density resolution, spatial resolution, color/density reproduction, etc. However, digital photoprinters are capable of outputting prints that assure almost 100% reproduction of the image density information that is recorded on the films.

A digital photoprinter which has such advantageous features is composed of the following basic parts: a reading apparatus that reads the image as recorded on a film, a setup apparatus in which the image thus read is subjected to processing so as to determine the conditions for subsequent exposure, and an image forming apparatus that scan exposes a light-sensitive material in accordance with the thus determined conditions for exposure and which then performs development and subsequent processing of the exposed light-sensitive material.

In the apparatus for reading the image recorded on a film, typically in the case of image reading by slit scanning, the film is illuminated with slit reading light which extends in a one-dimensional direction while, at the same time, the film is moved in a direction generally perpendicular to the one-dimensional direction (alternatively, both the reading light and a photoelectric transducer device are moved), whereby the film is scanned in two-dimensions with the reading light.

The light that has passed through the film and which carries the image on it is focused on the light-receiving surface of a photoelectric transducer device such as a charge-coupled device (hereunder abbreviated as "CCD") line sensor, where the light is subjected to photoelectric conversion for image reading.

The image information thus read is amplified, converted to a digital signal and subjected to various image processing operations such as correction of characteristic errors in the CCD device, changing the density and scaling before transfer to the setup apparatus.

In the setup apparatus, the transferred image information is reproduced as a visible image on a display such as a CRT (cathode-ray tube). The operator who is looking at the reproduced image may perform any necessary additional corrections such as gray-level or gradation correction and color/density correction. When the reproduced image is acceptable (passes the verification), it is transferred as recording image information to the image forming apparatus.

If the image forming apparatus is of a type that uses raster scanning (scanning by light beam) for recording image, three light beams that are capable of exposure for three primary colors, (R, G and B) are modulated in accordance with the above-mentioned recording image information so that they are deflected in a fast scan direction (corresponding to the above-mentioned one-dimensions direction) while, at the same time, the light-sensitive material is transported for slow scanning in a direction generally perpendicular to the fast scan direction (i.e., the deflected light beams and the light-sensitive material are slow scanned relative to each other), whereby the light-sensitive material is scan exposed in two-dimensional with light beams that have been modulated in accordance with the recorded image, with the thus read image on the film being recorded on the light-sensitive material.

The exposed light-sensitive material is then subjected to development and subsequent processing in accordance with the type of light-sensitive material. In case of silver halide photography, the light-sensitive material is subjected to processing that includes color development, bleach fixing, washing, drying, etc., and the finished print emerges from the image forming apparatus.

As is well known, films are not always exposed to an appropriate amount of light and the exposure may be insufficient (underexposed) or excessive (overexposed).

Further, the image recorded on negative films usually has a density D (log E) range of about 3.2, whereas the image recorded on reversal films has a wider density range of about 3.8.

In order to produce finished prints of high quality with digital photoprinters, it is necessary to use a photoelectric transducer that has high resolving power in terms of both space and density (light quantity), and for this purpose a CCD sensor is typically used with advantage. However, a photoelectric transducer having high spatial and density resolving powers is generally limited in dynamic range (the range of densities that can be measured), and it is difficult to measure densities over the whole range of negative films ($D \simeq 3.2$) or reversal films ($D \simeq 3.8$).

In order to realize precise image reading by effective operation of the photoelectric transducer employed in the reading apparatus of a digital photoprinter, it is necessary to provide the normal amount of exposure (the product of light quantity and measurement time) that is appropriate for the particular photoelectric transducer. Therefore, if the quantity of reading light and the reading time are set in accordance with an underexposed image which transmits a large amount of light, the amount of light received by the photoelectric transducer means is insufficient for other images to be read correctly. To avoid this problem, the quantity of reading light and the reading time are set in accordance with films that will transmit theoretically the least possible amount of light (i.e., overexposed films-having the highest density) and precise reading of the image on other films is insured by adjusting the quantities of the reading light and the transmitted light with the aid of optical filters or imaging lens opening.

However, this practice requires not only optical members such as optical filters and an imaging lens, but also an apparatus for driving and adjusting such optical members. As a result, the reading unit becomes complex and bulky, leading to a higher cost of the digital photoprinter. Further, the measurement time is also set in accordance with overexposed films which require the longest measurement, and hence the efficiency of reading the image on films is too low to accomplish rapid emergence of finished prints.

In addition, as already mentioned, a photoelectric transducer having high spatial and density resolving powers is limited in dynamic range and it is incapable of reading information over the whole density range of the image recorded on negative or reversal films. However, in order to achieve satisfactory reproduction of the image that is carried on a film, one needs only to read the image information at a density in the range of about 2.0 depending upon the state of exposure of the film (i.e., whether it is correctly exposed, underexposed or overexposed).

Under these circumstances, in order to determine the range of densities that have to be read by the photoelectric transducer in an image reading apparatus of a type typically used in a digital photoprinter, the reading of the image on the film for printing is preceded by prescanning, which involves rough reading of the image on the film with the dynamic range of the photoelectric transducer being rendered effectively wide, and the range of densities to be read by the CCD sensor during main scanning is determined in accordance with the result of the prescanning operation.

Thus, a digital photoprinter reads the image on the film by a procedure that consists, in sequence, of prescanning, determination of the range of densities that need be read, and main scanning. With the conventional system, prescanning is followed by an intermediate step in which the film or the reading light source and the CCD sensor are returned to the state where they are ready for the start of another reading cycle before main scanning is effected. This further reduces the efficiency of reading the image on the film and, in addition, the movement of the film (or the combination of the reading light and the CCD sensor) becomes so complicated that not only the structural complexity but also the cost of the image forming apparatus is increased.

SUMMARY OF THE INVENTION

The present invention has been accomplished under these circumstances, and has as an object of providing an apparatus that reads the image on transmission-type originals such as negative and reversal films for use on digital photoprinters and the like and which has an inexpensive and simple construction and yet is capable of efficient and rapid image reading operations.

In accordance with the above and other objects, in a first embodiment of the present invention an image reading apparatus is provided that comprises a light source illuminating a transmission-type original which carries image information with reading light of the light source, and a photoelectric transducer means that varies the reading time of the image information in accordance with the image density information on the transmission-type original.

In this first embodiment, the image information is preferably read by scanning, and the reading time of the image information is preferably varied by controlling the scan speed of the photoelectric transducer means.

Moreover, the photoelectric transducer means is semiconductor image sensor, wherein the reading time of the image information is preferably varied by controlling the charging time of the semi-conductor image sensor.

Further, a second embodiment of the present invention is an image reading apparatus that comprises a light source illuminating a transmission-type original which carries image information with reading light from the light source, a photoelectric transducer means that reads the image information the necessary number of times in accordance with the image density information on the transmission-type original, at least one memory that stores and holds the image information as read with the photoelectric transducer means, and an image input means by which the image information is entered sequentially into the memory in accordance with the image density information on the transmission-type original, and wherein image information having the necessary amount of light is produced on the basis of the image information as stored and held in the memory.

In each of the first and second embodiments of the present invention, the transmission-type original is preferably subjected to prescanning for obtaining the image density information on the original before it is read.

The third embodiment of the present invention is basically an image reading apparatus that illuminates a transmission-type original with reading light and in which the light that has passed through the transmission-type original is read by a photoelectric transducer means so as to read the image that is carried on the transmission-type original, which apparatus is characterized by having a prescanning unit that illuminates the transmission-type original with prescan reading light and in which the light that has passed through the transmission-type original is read by a photoelectric transducer means having a wide dynamic range to obtain the outline of the image as carried on the transmission-type original, and a main scanning unit that illuminates the transmission-type original with main scan reading light after the end of image reading by the prescanning unit and in which the light that has passed through the transmission-type original is read by a photoelectric transducer means having high resolving power in accordance with the image density information on the transmission-type original as obtained by the prescanning unit, whereby details of the image as carried on the transmission-type original are read.

The image reading apparatus of the present invention is such that a transmission-type image as recorded on negative films, positive films and other transmission-type originals for use on digital photoprinters and the like (which transmission-type image is hereunder referred to simply as the "image") is read photoelectrically by a photoelectric transducer means such as a CCD line sensor. The first embodiment of the invention has a basic concept wherein the time of reading image information by the photoelectric transducer means is varied in accordance with the image density information on the transmission-type original. The basic concept of the second embodiment also relates to an image reading apparatus of such a type that the image on a transmission-type original for use on digital photoprinters and the like is read photoelectrically by means of a photoelectric transducer means such as a CCD line sensor, and the number of times for reading the image information by the photoelectric transducer means is altered in accordance with the image density information on the transmission-type original. The basic concept of the third embodiment is such that the image reading apparatus has a prescanning unit that reads roughly the image on a transmission-type original by means of a photoelectric transducer means having a wide dynamic range and a main scanning unit that reads closely the image as carried on the transmission-type original in accordance with the data of this prescanning operation.

In order to insure that the quantity of light is measured by the photoelectric transducer means with high precision and efficiency, it is necessary that the measurement be done with the appropriate light reception (as expressed by the product of the quantity of light and the measuring time) that is appropriate for the specific type of photoelectric transducer means employed.

Transmission-type originals such as negative and positive films are not always imaged in the correct state of exposure and often such originals can be overexposed or underexposed, thereby causing the image as carried on a transmission-type original to exhibit different densities in relative terms depending upon its state of exposure. In other words, the relative quantity of light that passes through the image as recorded on a negative film or the like to be received by the photoelectric transducer differs depending upon the state of exposure of the transmission-type original of interest (i.e., whether it is correctly exposed, underexposed or overexposed).

In the conventional apparatus for reading images on films and the like, the amount of light to be received by the photoelectric transducer is set by selecting the quantity of light from the light source, the measurement time (the period of light reception by the photoelectric transducer means) and other factors in accordance with the image that transmits the least amount of light, or the overexposed image, and the correctly exposed image or the underexposed image is read by adjusting the quantity of light to be admitted into the photoelectric transducer through the use of optical filters for adjusting the quantity of light incident upon the image on a film or a diaphragm stop, etc., provided in association with the imaging lens.

As already mentioned hereinabove, this practice increases the complexity and cost of the reading apparatus and, at the same time, efficient and rapid image reading operations cannot be performed since the time of measurement with the photoelectric transducer means is set in accordance with the overexposed image which requires a long measurement time.

In contrast, an image reading apparatus according to the first embodiment of the present invention is such that the time of measurement of transmitted light by the photoelectric transducer (if the transducer is a CCD sensor, the time of measurement is an accumulation time or a CCD clock rate) is adjusted in accordance with the image density data of a transmission-type original of interest such as those obtained by prescanning.

Stated more specifically, compared to an overexposed transmission-type original which transmits less light, the time of measurement in the case of reading an image on a normal exposed original which transmits more light is shortened and the image on an underexposed original which transmits even more light is read within an even shorter time of measurement than in the case of a normal exposed original. If the apparatus is of such a type that image reading is effected by optical scanning, the scan speed is also preferably adjusted in association with the adjustment of the measurement time.

In an image reading apparatus according to the second embodiment of the present invention, the number of times the image is read by the photoelectric transducer is adjusted in accordance with the image density data of a transmission-type original of interest such as those obtained by prescanning.

Stated more specifically, compared to an overexposed transmission-type original which transmits less light, the number of times the image is read on a normal exposed original which transmits more light is decreased, and the image on an underexposed original which transmits even more light is read a greater number of times than in the case of the normal exposed original. For example, in initial condition that eight image readings are employed for an overexposed transmission-type original, when the image on the normal exposed original is read, or when the image on the underexposed transmission-type original is read, the number of readings of the image is decreased gradually.

If desired, the adjustment of the number of times for image reading may be combined with the adjustment of the time for measurement on transmitted light by the photoelectric transducer means which is effected in the first embodiment of the present invention. Alternatively, the adjustment of the number of times for image reading may be combined with the adjustment of optical filters or a lens opening that are provided for adjusting the quantity of light. An example of this combined adjustment is as follows: eight image readings are carried out for an overexposed transmission-type original and, at the same time, the time of measurement by the photoelectric transducer means or optical filters or lens opening is adjusted; four image readings are employed for a normal exposed original and, at the same time, the time of measurement by the photoelectric transducer means or optical filters or lens opening is adjusted; and one reading of an image are used for an underexposed original and, at the same time, the time of measurement by the photoelectric transducer means or optical filters or lens opening is adjusted.

Thus, according to the present invention, not only the optical filters and lens opening for adjusting the quantity of light but also the means for adjusting these optical components can be eliminated, and hence one can realize image reading apparatuses that are simple in system configuration and which are less costly.

In addition, compared to the prior art image reading apparatus which sets the time of measurement in accordance with the type of transmission-type original that takes the longest time of measurement, the length of time for reading the image on the species of transmission-type original that permits measurement in a short time can be reduced, which enables rapid and efficient image reading operations. Particularly, considerable reduction in processing time can be achieved with negative films and the like for pictorial photographs since many of them are correctly exposed.

If the second embodiment of the present invention is combined with the first embodiment or the adjustment of light quantity by optical filters or lens opening, the appropriate reading range can be selected without widening the dynamic range of the photoelectric transducer means or the range over which the optical filters or lens opening can be moved. This offers the advantage that the means for driving the photoelectric transducer means or the means for adjusting the optical filters or lens opening can be composed of a simple mechanism.

In order to output image of high quality, it is necessary to employ a photoelectric transducer that has high spatial and density resolving powers. However, as already mentioned, such high-performance photoelectric transducers are generally limited in dynamic range and it is difficult to measure densities over the whole ranges for the images that are recorded on negative and reversal films.

For satisfactory reproduction of an image that is carried on a transmission-type original, one needs only to read image densities over the range of about 2.0, depending upon the state of exposure of the original. Hence, the conventional image reading apparatus performs prescanning to read the image on the transmission-type original roughly before its main scanning is started. On the basis of the result of this prescanning operation, the range of image density reading to be effected during main scanning is determined.

As already mentioned hereinabove, this increases the complexity in the movement of the film (as well as the source of reading light and the photoelectric transducer) and the system configuration so much as to reduce the efficiency of image reading operations while increasing the cost of the apparatus.

In contrast, an image reading apparatus according to the third embodiment of the present invention has a prescanning unit that reads roughly the light passing through the transmission-type original by a photoelectric transducer means having a wide dynamic range to get the outline of the image as carried on the original, particularly with respect to the density range, and a main scanning unit that reads with high resolution the transmitted light through the original in accordance with its image data that have been attained by the prescanning unit.

In the image reading apparatus according to the third embodiment of the present invention, the prescanning unit provides the outline of the image on the transmission-type original to determine the range of densities that needs be read, and then, in a continuous manner, the main scanning unit reads the image on the original with high spatial and density resolutions.

In the conventional image reading apparatus, the transmission-type original with which the prescanning step has ended is returned to the initial start point for image reading before main scanning is effected. This is not necessary for the image reading apparatus of the present invention, and the transmission-type original need be moved in only one direction. Therefore, the movement of the original and the device for transporting it can be greatly simplified.

The present invention is also advantageous in the case of reading images from a continuous series of transmission-type originals as in a roll of film. When prescanning ends for a certain original, it is continuously subjected to main scanning but, at the same time, the next original can be prescanned, thereby achieving the reading of successive originals with an extremely high efficiency.

DESCRIPTION OF THE PREFERRED EMBODIMENTS

Preferred embodiments of image reading apparatuses of the present invention are described below with reference to the accompanying drawings.

Figure 1:
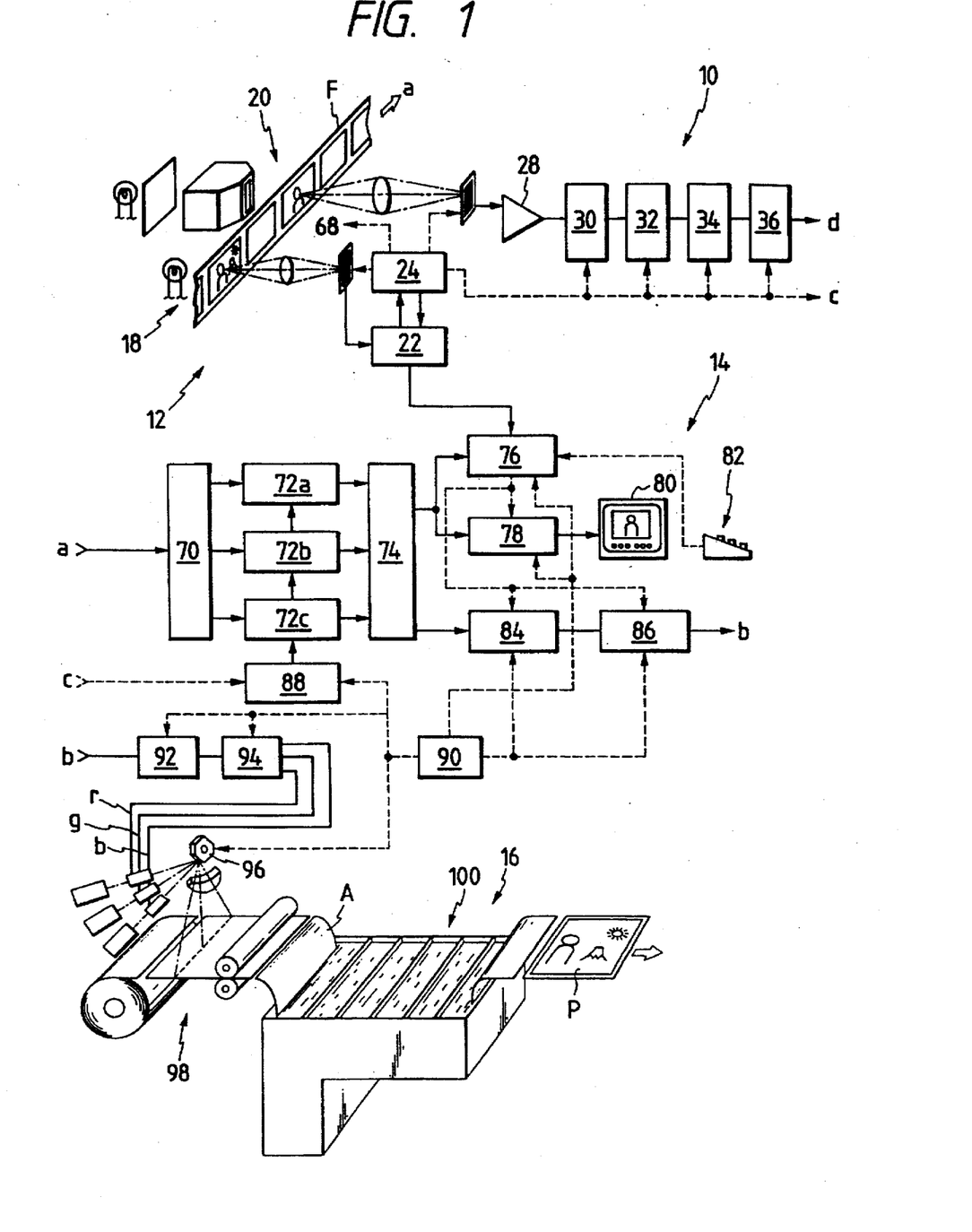
FIG. 1 is a diagram showing an exemplary digital photoprinter that uses an image reading apparatus according to first to third embodiments of the present invention.

FIG. 1 shows conceptually an exemplary digital photoprinter that employs an image reading apparatus according to the present invention. In FIG. 1, the flow of image information is indicated by solid lines, the flow of control signals by dashed lines, and rays of light by one-long-and-one-short dashed lines.

The digital photoprinter, which is generally indicated by 10 in FIG. 1, reads transmission-type images sequentially on a frame-by-frame basis as they are recorded on exposed negative or reversal films that take 24, 36 or more pictures. After performing the necessary image processing on the thus read images, the printer performs a setup operation for producing a full-color printed image (output image), which is then recorded on a light-sensitive material A by scan exposure and subjected to development and subsequent processing to output a finished print P.

The digital photoprinter 10 includes the following basic components an image reading apparatus 12, a setup apparatus 14, and an image forming apparatus 16. The image reading apparatus 12 sequentially reads the transmission-type images that are recorded on an exposed roll of film F (such transmission-type images are hereinafter referred to simply as "images") and performs the necessary image processing. The setup apparatus 14 displays the simulation of the thus read images and checks the quality to determine the conditions for image formation (setup conditions). The image forming apparatus 16 scan exposes the light-sensitive material A in accordance with the image forming conditions that have been determined by the setup apparatus 14 and performs development and subsequent processing on the exposed light-sensitive material A to produce a finished print P.

The image reading apparatus shown in FIG. 1 as indicated by 12 includes as basic components: a prescanning unit 18, a main scanning unit 20, a prescanning calculation and storage unit 22, a reading control unit 24, an amplifier 28, an analog/digital (hereunder abbreviated as A/D) converter 30, a CCD correcting unit 32, a density changing unit 34, and a scaling unit 36.

The image reading apparatus 12 reads photoelectrically the images recorded on the developed film F on a frame-by-frame basis as it is transported in the direction of arrow a. The thus read image information is then subjected to various image processing operations, such as A/D conversion, correction of the measured values, change in density, scaling and sharpness enhancement, before it is sent to the setup apparatus 14.

Figure 2:
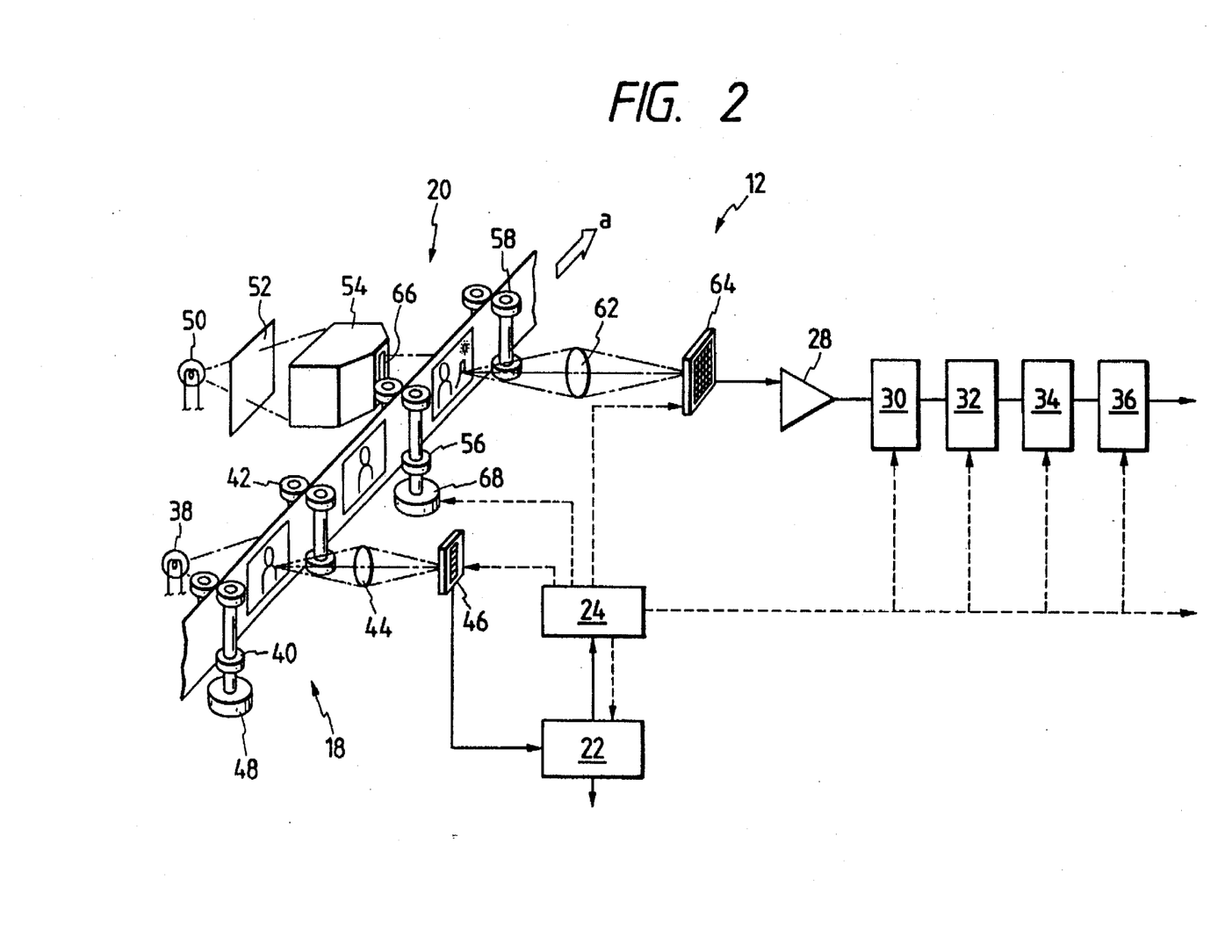
FIG. 2 is a perspective view showing part of the image reading apparatus in the digital photoprinter shown in FIG. 1.

FIG. 2 is a diagram showing schematically the image reading apparatus 12. The elements similar to in FIG. 1 are represented by same reference numerals.

The illustrated image reading apparatus 12 according to the present invention is provided with the prescanning unit 18 and the main scanning unit 20 which are independent of each other. In the first place, the image recorded on the film F is read roughly to give the outline of the image. Then, in accordance with the results of prescanning in the unit 18, not only the range of image densities that need be measured but also the time of measurement (in the illustrated case, the time of measurement is exemplified by the accumulation time of main scanning line CCD assembly 64) and the scan speed of film F are adjusted so that the image on film F is read with high spatial and density resolutions by the main scanning unit 20.

The prescanning unit 18 has a prescanning light source 38, roller pairs 40 and 42 for transporting the film F, an imaging lens 44 and a prescanning line CCD assembly 46.

The light source 38 emits light for prescanning the images on the film F. For this purpose, any of various light sources including halogen lamps and fluorescent lamps that are used in ordinary image reading operations can be employed as long as they can emit sufficient amounts of light to be read by the prescanning CCD assembly 46.

The roller pairs 40 and 42 hold the film F in areas other than the image region and transport it at a predetermined speed in the direction of scan transport, which is indicated by arrow a. Thus, the film F is scan transported by the roller pairs 40 and 42 so that the entire surface of the film is illuminated with prescanning light from the light source 38.

The roller pair 40 is driven by a motor 48 which serves as a drive source, and the roller pairs 40 and 42 are adapted to rotate at the same speed by known means such as a transmission gear or a timing belt. In the case of the illustrated image reading apparatus 12, the scan transport speed for main scanning is altered in accordance with the result of the prescanning operation and, hence, the speed of transport by the roller pairs 40 and 42 is preferably adjusted to be at least equal to the maximum scan speed during main scanning.

The motor 48 may be of any known type that is capable of transporting the film F with the necessary precision, a typical example of which is a pulse motor.

The light that has passed through the film F (to be more exact, the image recorded on the film F) is focused by the imaging lens 44 to be directed into the prescanning CCD assembly 46 as a focused beam. The prescanning CCD assembly 46 is composed of three line CCDs that may typically correspond to R (red), G (green) and B (blue). The assembly separates the transmitted light into the three primary colors, measures the quantity of light for each color, and converts the measured quantities photoelectrically, thereby reading them as image information for R, G and B.

In the illustrated image reading apparatus 12, the prescanning unit 18 performs prescanning primarily for determining the density range for image reading in the main scanning step, the accumulation time (CCD clock rate) of the main scanning CCD assembly 64, and the scan speed. Therefore, the prescanning CCD assembly 46 for measuring the transmitted light need not have high spatial or density resolving power as long as its dynamic range is wide enough to enable density measurements over the whole range that permits recording on the film F.

In the conventional image reading apparatus, both prescanning and main scanning operations are performed by the same photoelectric transducer (hence the same image reading unit). As already mentioned hereinabove, this makes it impossible to read a plurality of images with high efficiency for various reasons such as the inability to execute the reading of successive images in a continuous manner and the need to return the prescanned image to the initial start point for image reading.

In contrast, the third embodiment of the present invention is arranged so that the prescanning unit 18 which effects rough reading of the image to determine the reading conditions is provided independently of the main scanning unit 20 which performs image recording (printing) with high spatial and density resolutions in accordance with the result of the prescanning operation. Stated more specifically, prescanning and main scanning operations are accomplished using different line CCD assemblies (photoelectric transducers). Because of this arrangement, the transmission-type original to be read need be moved in only one direction so that the movement of the original and the mechanism of the device for transporting it are greatly simplified. Particularly, in the illustrated case which uses a roll of film consisting of a plurality of transmission-type originals, the original for which the prescanning step has ended can be successively subjected to main scanning while, at the same time, the next original can be prescanned, thereby accomplishing the reading of more than one transmission-type original with an extremely high efficiency.

The reading control unit 24 outputs a signal starting the prescan to the prescanning CCD 46 and the prescanning calculation and storage unit 22 so that the prescanning step is started.

The image information (density information) as read by the prescanning unit 18 is then transferred to the prescanning calculation and storage unit 22. The unit 22 uses the transferred image information to construct a histogram of the pixel density of the prescanned image. The unit then checks for the state of exposure of the image on the basis of the histogram (to see if the image is correctly exposed, underexposed or overexposed), thereby determining the density range for image reading in the main scanning step. Further, the unit 22 adjusts the accumulation time for the measurement by the main scanning CCD assembly 64, typically on the basis of the $D_{min}$ (minimum density) data in the histogram (the adjustment may be either direct or indirect through the adjustment of the CCD clock rate) and it also determines the speed of scan transport of the film F in the main scanning unit 20 in accordance with the adjusted accumulation time. The result of image reading by the prescanning operation is also transferred via the unit 22 to a setup calculation and storage unit 76 in the setup apparatus 14 (see FIG. 1).

The prescanning calculation and storage unit 22 transfers the thus determined density range for image reading and CCD accumulation time to the reading control unit 24, thereby controlling the image reading process in the main scanning step. Details of this point will be discussed later.

The reading control unit 24 also supplies an image information processing timing to the main scanning CCD assembly 64, the A/D converter 30, the CCD correcting unit 32, the density changing unit 34, and the scaling unit 36 and further to a timing selector 88 in the setup apparatus 14 (see FIG. 1).

The main scanning unit 20 performs image reading for the outputting (printing) purpose. The unit reads the prescanned image photoelectrically with sufficiently high space resolution (typically on the order of 1100 pixels by 1700 lines in the case of a 35-mm film) and density resolution in accordance with the result of the prescanning step and transfers the read image to the amplifier 28 as output image information.

The main scanning unit 20 which performs these functions has as basic components a main scanning light source 50, a filter unit 52, a light condensing unit 54, transport roller pairs 56 and 58; an imaging lens 62, and the main scanning CCD assembly 64.

The light source 50 issues light for reading the image on the film F and any of the various light sources including halogen lamps and fluorescent lamps that are used in ordinary image reading operations can be employed as long as they can emit sufficient amounts of light to be read by the main scanning CCD assembly 64. If desired, a single light source may be adopted that serves as both light sources 38 and 50.

The reading light issuing from the light source 50 enters the filter unit 52. The filter unit 52 is composed, in combination, of various filters including a heat shielding filter and a UV absorbing filter and it eliminates UV rays, heat rays and other unwanted components from the reading light that is to be incident on the film F.

The reading light that has passed through the filter unit 52 is launched into the light condensing unit 54. The unit 54 effects internal diffusion and condensing of the incident reading light so that it emerges through an opening 66 as a slit beam which has a longitudinal direction generally perpendicular to the scan direction (as indicated by arrow a in FIG. 1). The emerging beam is then incident on the film F.

Needless to say, the slit reading light emerging from the condensing unit 54 must be such that its dimension in the longitudinal direction is greater than that of the width of film F.

Like the roller pairs 40 and 42 in the prescanning unit 18, the roller pairs 56 and 58 hold between rollers the film F in areas other than the image region and transport it at a predetermined speed in the direction of scan transport which is indicated by arrow a. The roller pair 56 engages with a motor 68 which serves as a drive source, and the roller pairs 56 and 58 are adapted to rotate at the same speed by known means such as a timing belt or a transmission gear.

As already mentioned, the reading light is in a slit form with its longitudinal direction generally perpendicular to the direction in which it performs scanning. Hence, the film F (or the image on it) which is transported in the scan direction will eventually be subjected to two-dimensional slit scanning by the reading light over the entire surface.

In accordance with the illustrated image reading apparatus 12 of the present invention, the speed of scanning that is effected in the main scanning unit 20 is altered in accordance with the state of exposure of the film F that has been read by the prescanning operation. Stated more specifically, the scan speed is altered in such a way that a predetermined number of lines (typically 1700 lines in the scan direction on a 35-mm film as mentioned hereinabove) will be read in accordance with the accumulation time (CCD clock rate) of the main scanning CCD assembly 64 which is to be changed in accordance with the state of exposure of the film F.

To this end, the motor 68 is connected to the reading control unit 24 and the roller pairs 56 and 58 transport the film F at a predetermined scan speed associated with the state of exposure of the film F. Details of this point will be discussed later.

To realize highly precise image reading, the motor 68 is preferably of a high-precision type, as exemplified by a pulse motor or a dc motor.

The slit light that has passed through the film F is focused by the imaging lens 62 to be incident on the light-receiving surface of the main scanning CCD assembly 64 as a sufficiently focused beam to permit measurement of the quantity of the light.

The main scanning CCD assembly 64 is composed of three line CCDs that correspond to three primary colors R, G and B. Light that has passed through the film F and which carries the recorded image is separated by the assembly 64 into three primary colors, and the quantities of light beams for the respective colors are measured photoelectrically, thereby reading the images as recorded on the film F. In the aforementioned case of a 35-mm film, the assembly 64 reads one line (i.e., in the longitudinal direction of the transmitted slit light) in 1100 pixels. Thus, in the case of the illustrated image reading apparatus 12, the images recorded on a 35-mm film are read with a spatial resolution of 1100 pixels by 1700 lines.

The main scanning CCD assembly 64 which has high spatial and density resolving powers does not have a very wide dynamic range and it is difficult to read densities over the entire range that permits image recording on negative or reversal films. It should be noted here that images are not necessarily recorded over the entire density range that permits image recording on negative films and the like. Instead, as shown conceptually in FIG. 3, irrespective of the state of exposure of a particular image (whether it is normally exposed (N), underexposed (U) or overexposed (O)), the image density range covers values of about 2.0 in terms of D (=log E).

Under the circumstances, the main scanning CCD assembly 64 is connected to the reading control unit 24 and it performs image reading for a predetermined density region that is set in accordance with the state of exposure of the film F (or the image on it) which has been detected by the preceding prescanning operation.

In the illustrated case, if the image to be read is overexposed, a density region of D=1.0 to 3.0 is selected, if the image is correctly exposed, a density region of D=0.5 to 2.5 is selected, and if the image is underexposed, a density region of D=0.2 to 2.2 is selected. Image reading is thus performed for one of these density regions.

When reading images in the main scanning unit 20 of the image reading apparatus 12 according to the first embodiment of the present invention, not only the aforementioned density region for image reading but also the time of measurement by the photoelectric transducer and the speed of scan transport of the film F in the main scanning unit 20 are adjusted in accordance with the state of exposure of the film F (or the image on it) in response to instructions from the reading control unit 24.

Often, not all of the images recorded on the film F are in a correctly exposed state and many may have been given excessive exposure (overexposed) or insufficient exposure (underexposed). Hence, the relative quantity of light that is transmitted through the image will differ depending upon the state of its exposure and the overexposed image transmits less light than the normal exposed image.

In order to assure high precision when measuring the quantity of light by the photoelectric transducer, the light reception (the product of the quantity of light and the measurement time) must be appropriate for the specific type of the photoelectric transducer. To this end, the conventional image reading apparatus sets the quantity of reading light and the measurement time in accordance with the overexposed image which transmits the least amount of light in relative terms and which takes prolonged measurement. When reading a normal exposed or underexposed image, the quantity of reading light or transmitted light is adjusted by means of optical components such as filters and a diaphragm stop that are capable of adjusting the quantity of light. However, as already pointed out hereinabove, the conventional image reading apparatus having this construction is not only complex and expensive but also incapable of efficient image reading.

In contrast, the image reading apparatus 12 according to the present invention adjusts the time of measurement by the photoelectric transducer, namely, the accumulation time of measurement by the main scanning CCD assembly 64 in the illustrated case (the adjustment may be direct or indirect through the adjustment of the CCD clock rate) in accordance with the state of exposure of the image that is recorded on the film F and, furthermore, the speed of scan transport of the film F in the main scanning unit 20 is adjusted in accordance with the thus adjusted accumulation time of CCD. As a result, the configuration of the image reading apparatus is simplified, its cost is reduced and yet rapid image reading operations can be realized.

In the case, for example, of a frame of image that is recorded on a 35-mm film read with a resolution of 1100 pixels by 1700 lines, if the accumulation time of, for instance, a CCD clock rate of the main scanning CCD assembly 64 employed for reading the least light-transmissive overexposed (D=1.0 to 3.0) image is 0.59 MHz, the feed speed of the film F, namely, the time required for reading one line, is:

$$(1/0.59) \times 1100 = 1.86 \; msec/line.$$

Hence, the time required for reading one frame of image is:

$$1.86 \times 1700 = 3.16 \; sec.$$

The CCD clock rate of the main scanning CCD assembly 64 required for reading a normal exposed (D=0.5 to 2.5) image will now be calculated. Since the difference between the relative densities D of the overexposed and normal exposed images (particularly with respect to maximum density) is 0.5, $$0.5 = \log E$$

Hence, E=3.16 and 3.16×0.59=1.87 MHz.

Therefore, if the CCD clock rate of the main scanning CCD assembly 64 is altered to 1.87 MHz for reading the normal exposed image, the feed speed of the film F is calculated as:

$$(1/1.87) \times 1100 = 588 \; \mu sec/line,$$

and the time required for reading a frame of image is:

$$588 \times 1700 = 1 \; sec.$$

Similarly, the CCD clock rate of the main scanning CCD assembly 64 required for reading an underexposed (D=0.2 to 2.2) image will now be determined. Since the difference between the relative densities D of the normal exposed and underexposed images is 0.3, $$0.3 = \log E$$

Hence, E=2.00 and 2.00×1.87=3.74 MHz.

Therefore, if the CCD clock rate of the main scanning CCD assembly 64 is altered to 3.74 MHz for reading the underexposed image, the feed speed of the film F is calculated as:

$$(1/3.74) \times 1100 = 294 \; \mu sec/line,$$

and the time required for reading a frame of image is:

$$294 \times 1700 = 0.5 \; sec.$$

These numerical data are listed collectively in the following table 1:

TABLE 1

|  | CCD clock rate | Feed Speed | Reading time |
| --- | --- | --- | --- |
| Overexposed | 0.59 MHz | 1.86 msec/line | 3.16 sec |
| Normal exposed | 1.87 MHz | 588 μsec/line | 1 sec |
| Underexposed | 3.74 MHz | 294 μsec/line | 0.5 sec |

In the conventional image reading apparatus, the CCD clock rate of the main scanning CCD assembly and the scan speed of the film F are set in accordance with an overexposed image, which requires the longest time of measurement. Therefore, the time required for reading a film that containing 24 images is independent of the state of the images recorded on the film F and is always constant at:

$$3.16 \times 24 = 75.8 \; sec.$$

In contrast, with the image reading apparatus of the present invention which alters the CCD clock rate of the main scanning CCD assembly 64 and the scan speed of the film F in accordance with the state of exposure of a particular image in an exemplary case where the film F contains 20 normal exposed images, two over-exposed images and two underexposed images, the time required for reading the 24 images is calculated as:

$$1 \times 20 + 3.16 \times 2 + 0.5 \times 2 = 27.32 \; sec.$$

Thus, the image reading apparatus of the present invention achieves a marked improvement in the efficiency of reading the image that have been recorded on the film.

Further, the accumulation time (the CCD clock rate in the case under discussion) and the scan speed of the film F are altered in accordance with the state of exposure of a specific image and, hence, there is no need to adjust the quantity of transmitted light that is launched into the main scanning CCD assembly 64. Accordingly, the need to provide members for adjusting the quantities of reading light and transmitted light, as well as to provide means for controlling them is eliminated, whereby the composition of the image reading apparatus is greatly simplified to achieve reduction in the cost of the apparatus.

The foregoing description concerns the case where both the accumulation time and the CCD clock rate are altered. However, this is not the sole case of the present invention and the same results can be attained even if the accumulation time alone is altered while the CCD clock rate is held constant at an adequately high speed. Exemplary data for this alternative case are shown in the following table 2, in which the accumulation time is calculated for one line.

TABLE 2

|  | CCD clock rate | Accumulation time | Reading time |
| --- | --- | --- | --- |
| Overexposed | 3.74 MHz | 1.86 msec/line | 3.16 sec |
| Normal exposed | 3.74 MHz | 588 μsec/line | 1 sec |
| Underexposed | 3.74 MHz | 295 μsec/line | 0.5 sec |

The R, G and B information about the image on the film F as read by the main scanning CCD assembly 64 (such information is hereunder collectively referred to as the "image information") is amplified in the amplifier 28 and converted to a digital signal by the A/D converter 30.

The image information is then fed to the CCD correcting unit 32, where it is corrected for any errors (variations) in each of the pixels in the main scanning CCD assembly 64, as well as variations in every pixels and in dark current. Thereafter, the corrected image information is sent to the density conversion unit 34 converting the density of the image information and to the scaling unit 36, where it is subjected to scaling and sharpness enhancement (with an unsharp mask) before it is transferred to the setup apparatus 14.

Figure 4:
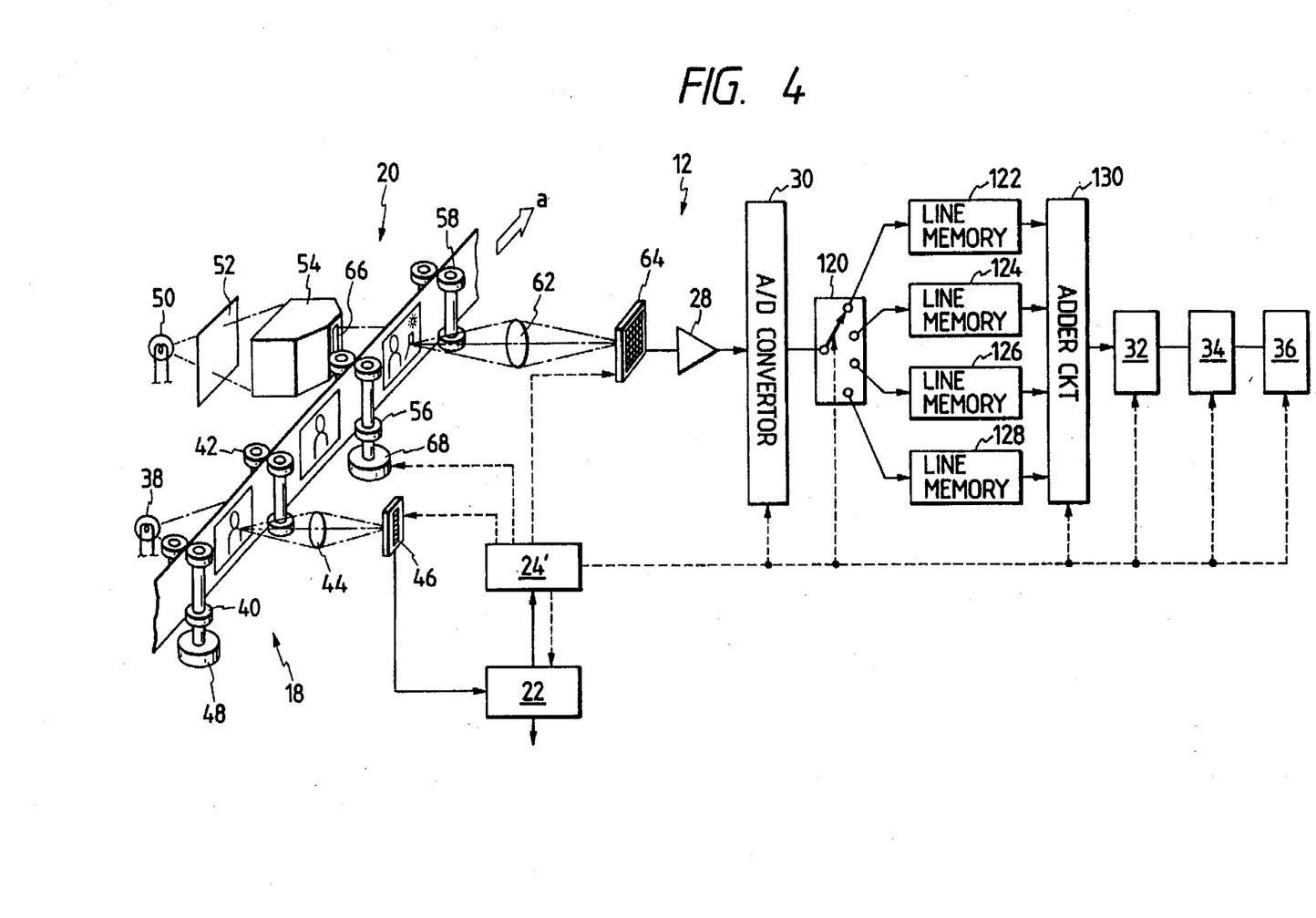
FIG. 4 is a diagram showing an image reading apparatus according to the present invention.

A image reading apparatus of a second embodiment of the present invention is described below with reference to FIG. 4. The elements similar to the image reading apparatus 12 shown in FIG. 2 are represented by same reference numerals. Image information that has been read by the main scanning CCD assembly 64 and which is thereafter amplified by the amplifier 28 is fed to the A/D converter 30, where it is converted to a digital signal, which is then fed to a multiplexer 120. The multiplexer 120 is connected to line memories 122, 124 and 126 and by changing the contact points on the multiplexer 120 (which is an image information input means), the image information is sequentially stored in the respective line memories. The pieces of image information that have been stored and held in the respective line memories are fed to an adder circuit 130 where they are added to each other.

The timing signals (i.e., CCD drive signal, conversion timing signal and change timing signal) in necessary rates that control the drive of the main scanning CCD assembly 64, A/D converter 30 and the multiplexer 120 are generated by a reading control circuit multiplexer 24'. Further the reading control circuit 24' supplies control signals to the prescanning calculation and storage unit 22, the adder circuit 130, the CCD correcting unit 32, the density changing unit 34 and the scaling unit 36.

Figures 3, 6:
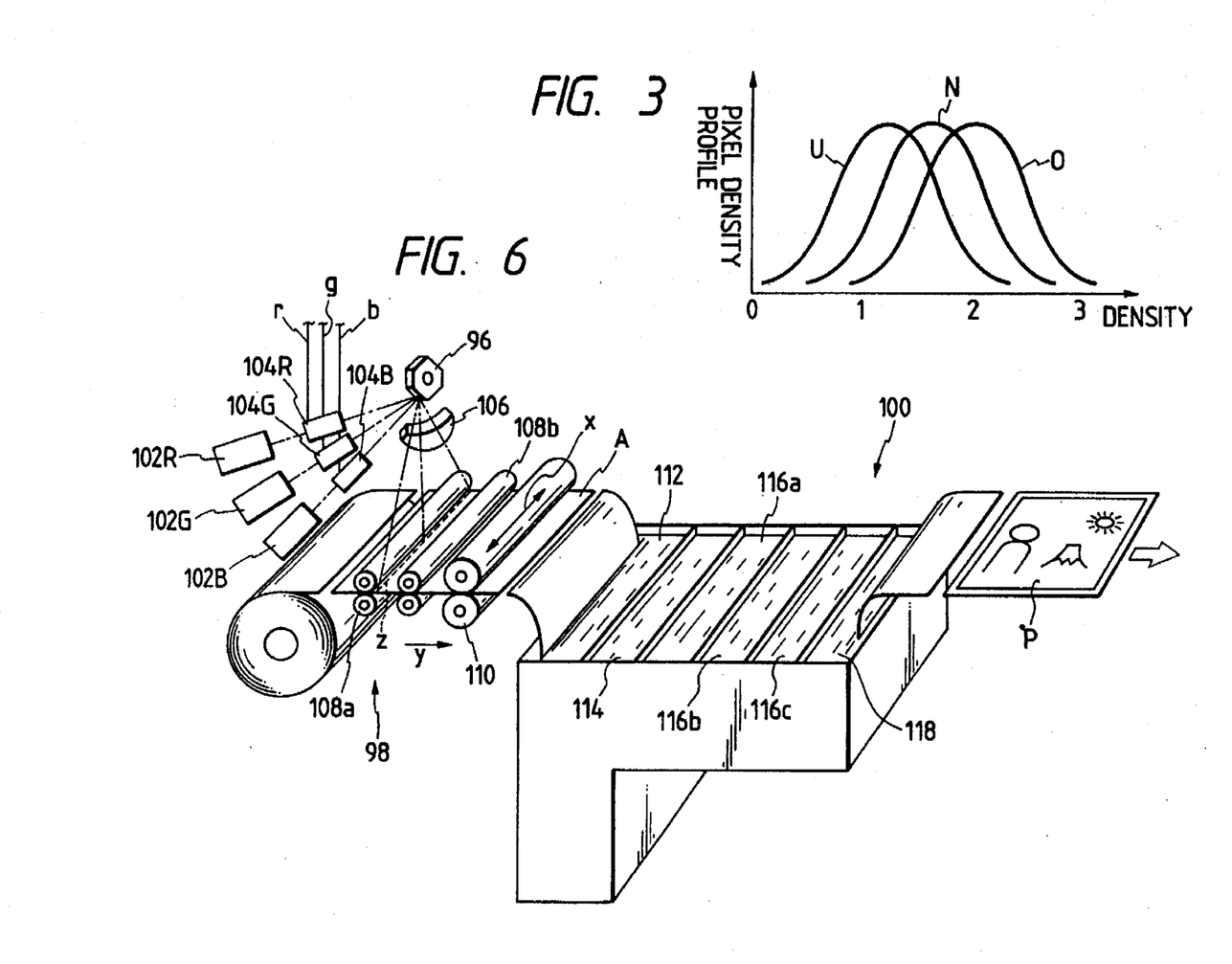
FIG. 3 is a graph plotting an exemplary pixel density profile of an image recorded on a film.
FIG. 6 is a diagrammatic perspective view showing part of the image forming apparatus in the digital photoprinter shown in FIG. 1.

As already mentioned in connection with FIG. 3, the image reading operation in the main scanning unit 20 requires that the appropriate density region for image reading be selected in accordance with the state of exposure of the film F (or the image carried on it). Hence, in the second embodiment of the present invention, basic values for the quantity of reading light and the measurement time are set in accordance with the underexposed image and more than one reading cycle is executed when reading normal exposed and overexposed images.

In the second embodiment, as combined with the above-described first embodiment, the number of times for executing the image reading operation is determined by the following procedure on the basis of the state of exposure. Stated more specifically, the underexposed state is used as a reference, and as the density is shifted from the normal exposure to the under-exposure, the number of times for image reading is increased progressively so as to enable selection of the appropriate density region for image reading. The density shifting region from the underexposed to the overexposed state covers the range from 0 to 1.5. In the following explanation, it is described in case that the density is properly shifted in this range to select the appropriate density region for image reading.

If the necessary amount of density shift is 0 to 0.8, the image is read with the accumulation time or clock rate of the main scanning CCD assembly 64 being varied in accordance with the above-described first embodiment of the present invention, whereby the required quantity of light is assured on the basis of the image information as stored and held in one line memory.

If the amount of density shift is 0.9 to 1.2, the accumulation time or the clock rate is varied and, at the same time, the image reading operation is executed twice to store and hold the image information in two line memories. The pieces of image information as stored in the respective line memories are added to each other, thereby assuring the required quantity of light.

If the amount of density shift is 1.2 to 1.5, the accumulation timer or the clock rate is varied and, at the same time, the image reading operation is executed four times to store and hold the image information in four line memories. The pieces of image information stored in the respective line memories are added to each other, thereby assuring the required quantity of light.

In these cases, the control of the accumulation time or clock rate, as well as the control over changing the contact points on the multiplexer 120 for feeding the image information into more than one line memory are executed by the associated timing signals which are generated from the reading control unit 24'.

In the second embodiment of the present invention, the change in the number of times the image reading operation is repeated may be combined with varying the accumulation time or clock rate of the main scanning CCD assembly 64. Alternatively, the accumulation time or clock rate of the main scanning CCD 64 is fixed and the change in the number of times for repeating the image reading operation may be combined with controlling, in accordance with the state of exposure of a particular image, the optical filters for adjusting the quantity of light that has passed through the film F and/or the lens opening for adjusting the quantity of reading light that has been emitted by the light source 50. In this alternative case, the optical filters and the lens opening are adjusted on the basis of a light quantity adjust signal generated by the timing generator circuit 132 (see FIG. 4, dashed lines). On the other hand, the rates of CCD drive signal and conversion timing signal that are also generated by the timing generator circuit 132 are fixed.

As already noted hereinabove, the number of times for repeating the image reading operation is based on the state of exposure of the image to be read and if the amount of density shift is 0 to 0.8, the optical filters and/or lens opening and, hence, the quantity of incident light that is launched into the main scanning CCD assembly 64 is adjusted for reading the image, whereby the required quantity of light is assured on the basis of the image information as stored and held in one line memory.

If the amount of density shift is 0.9 to 1.2, the quantity of incident light is varied and, at the same time, the image reading operation is executed twice to store and hold the image information in two line memories; the pieces of image information as stored and held in the respective line memories are added to each other, thereby assuring the required quantity of light.

If the amount of density shift is 1.2 to 1.5, the quantity of incident light is varied and, at the same time, the image reading operation is executed four times to store and hold the image information in four line memories. The pieces of image information as stored and held in the respective line memories are added to each other, thereby assuring the required quantity of light.

In accordance with the second embodiment of the present invention which has been described above, the main scanning CCD assembly 64 and the A/D converter 30 need only be operated within the range of 0 to 2.0 even in the case where the appropriate density region for image reading is selected from the wider range of 0.2 to 3.7. Thus, even in a case like the one described above where the density region for image reading covers a wide range, the appropriate density region for image reading can be selected without widening the range over which the accumulation time or clock rate of the main scanning CCD assembly 64 can be varied.

If desired, the accumulation time or clock rate of the main scanning CCD assembly 64 may be fixed, but the optical filters for adjusting the quantity of light that has passed through the film F or the lens opening for adjusting the quantity of reading light issuing from the light source 50 is controlled in accordance with the state of exposure of a particular image. In this modified embodiment, the optical filters and the lens opening need only to be operated within the range of 0 to 0.9, even in the case where the appropriate density region for image reading is selected from the wider range of 0.2 to 3.7. Thus, even in a case like the one described above where the density region for image reading covers a wide range, the appropriate density region for image reading can be selected without widening the range over which the optical filters or lens opening must be moved.

When the appropriate density region for image reading is selected to obtain image information having the required quantity of light in the second embodiment of the present invention, the reading time of the main scanning CCD assembly 64 is varied or the quantity of transmitted light or reading light is adjusted if the image to be read is underexposed and if the image is overexposed, the adjustment of the reading time of the main scanning CCD assembly 64 or the quantity of light is combined with the addition of a plurality of image information signals. Alternatively, instead of performing the additional adjustment of the reading time of the main scanning CCD assembly 64 or the quantity of light, more line memories may be provided to further increase the number of times for repeating the image reading operation, whereby the appropriate density region for image reading and the number of times the image reading operation is repeated are rendered to correspond to each other in the applicable density region, so that the image information having the required quantity of light can be obtained by merely performing the image reading operation several times.

If desired, more than one image reading operation may be executed and the pieces of image information as stored and held in a plurality of line memories are added to each other to obtain the image information having the required quantity of light. According to another approach, pieces of image information may be sequentially stored and held in at least one line memory and they are sequentially added to one another within the single line memory so as to obtain the image information having the required quantity of light.

In the illustrated image reading apparatus 12, the speed of scanning the film F in the main scanning unit 20 is variable and, furthermore, the prescanning unit 18 must be so adapted that in no case will it exert back tension on the process of scan transport in the main scanning unit 20. To this end, the speed of scan transport in the prescanning unit 18 is preferably at least equal to the maximum speed that is achieved in the main scanning unit 20. Therefore, the space between the transport roller pair 42 in the prescanning unit 18 and the transport roller pair 56 in the main scanning unit 20 must be set so that the film F will slacken freely on account of the speed difference that develops between the prescanning unit 18 and the main scanning unit 20. If necessary, an accumulator for absorbing the slackening of the film F may be provided.

The means of scan transporting the film F is in no way limited to the illustrated roller pairs, and various known types of scan transport means such as a sprocket gear may be employed as long as they will not interfere with the passage of reading light through the film F nor damage its image plane.

In the examples described above, the image reading apparatus 12 implements the first or second embodiment of the present invention as combined with the third embodiment. However, these are not the sole cases of the present invention and the first to the third embodiments of the present invention may be implemented individually.

In the illustrated image reading apparatus 12, both the prescanning unit 18 and the main scanning unit 20 use a line CCD assembly as the photoelectric transducer means but the present invention is not so limited, and an area CCD assembly may be used as the photoelectric transducer.

Figure 5:
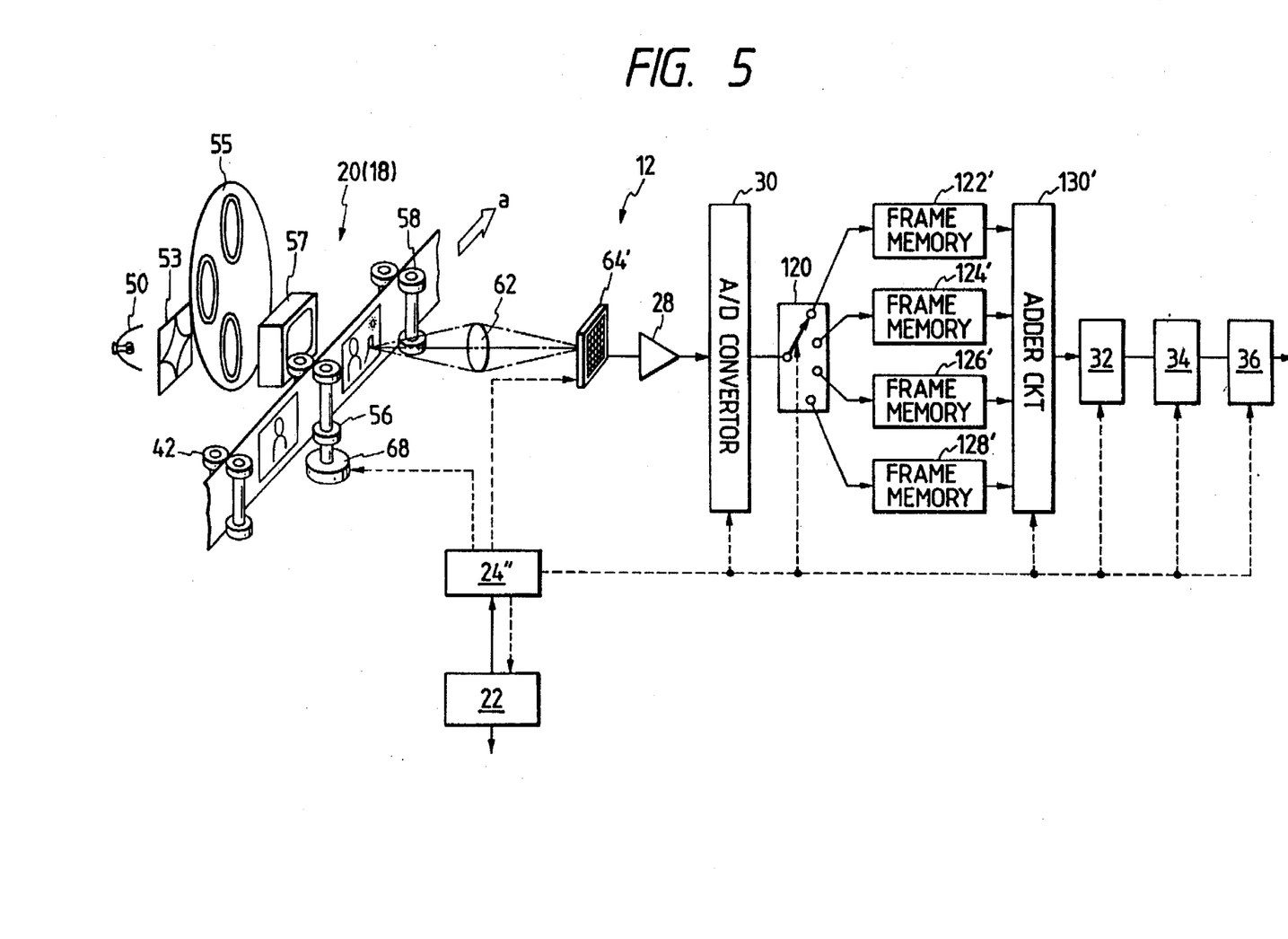
FIG. 5 is a another diagram showing an image reading apparatus according to the present invention.

With respect to FIG. 5, an image reading apparatus using an area CCD assembly is described. Elements similar to FIG. 4 are represented by same reference numerals, respectively. The different elements are represented such that a line CCD assembly 64, a reading control unit 24' and line memories 122 to 128 are replaced to an area CCD assembly 64', a reading control unit 24" and frame memories 122' to 128', respectively, and a prescanning operation and a main scanning operation are performed in the area CCD assembly 64' as one unit.

In the illustrated image reading apparatus 12, in order to read an image of film F every frame, the film F is transferred every frame. Further, before controlling an amount of the reading light, the light generated from the light source is received in the film F as an incident light through an iris 53 setting the required amount of light, a filter 55 separating colors R, G and B and a diffusing box 57 converting the light to a uniform light. The light of image through the film F is measured photoelectrically by the area CCD assembly 64'. The storage time and the number of the reading in the area CCD assembly 64' are controlled by the reading control section 24'. The accumulation time and the number of the reading is controlled to adjust the CCD clock-rate, the scanning speed and the number of the image reading according to information of the recorded images of the film which is obtained from other outside systems.

When using the area CCD assembly, the accumulation mode of the CCD is preferably a pseudo-field accumulation mode which has high vertical and dynamic resolutions. In a pseudo-field accumulation mode, the signal charges in one half of a field are not used and, hence, the sensitivity is lower than in other modes. However, if a plurality of image signals are added to each other as described in connection with the second embodiment of the present invention, one can compensate for the drop in sensitivity that occurs in the pseudo-field accumulation mode.

If the area CCD assembly is used, and particularly in the case of the second embodiment of the present invention, image information is stored and held at least in fields.

Besides CCDs, various other known types of photoelectric transducer means such as photomultipliers may be used in the present invention. If a photomultiplier assembly is used as the photoelectric transducer in the main scanning unit 20, the above-described object of the invention can be attained by gain adjustment.

As above described, by means of the prescanning and main scanning operations being performed consecutively, the involved effect occurs so as to further increase the overall efficiency of the image reading process, and preferable effect is obtained.

In the third embodiment, members for adjusting the quantity of reading light or transmitted light may be provided instead of adjusting the CCD clock rate and scan speed or the number of times for repeating the image reading operation in accordance with the state of exposure of the image to be read, and those adjusting members are adjusted in accordance with the state of exposure of the particular image.

Returning to FIG. 1, the setup apparatus 14 checks the quality of the image information as transferred from the image reading apparatus 12 and, after optional color/gradation correction, forwards it to the image forming apparatus 16 as image information for outputting (printing) purposes. For this purpose, the setup apparatus 14 includes as basic a first selector 70, three frame memories (FM) 72a, 72b and 72c, a second selector 74, a setup calculation and storage unit 76, a color/gradation correction display control unit 78, a display 80, an input unit 82, a color correction unit 84, a gradation correction unit 86, a timing selector 88, and an output timing control unit 90.

The setup of the image information from the scaling unit 36 starts with transferring it to the first selector 70. The first selector 70 causes the image information in successive frames of the film F to be distributed sequentially among the three frame memories 72a, 72b and 72c. To give an example, the first selector 70 initially selects a transfer path connected in such a way that the image information for the first frame is stored in the frame memory 72a. When the storage in the frame memory 72a ends, the first selector 70 is switched to a transfer path that causes the image information for the second frame to be stored in the frame memory 72b.

If the image information for the first frame is stored in the frame memory 72a, the second selector 74 connects the frame memory 72a to both the setup calculation and storage unit 76 and the display control unit 78.

The setup calculation and storage unit 76 receives not only the prescanned image information as transferred from the prescanning calculation and storage unit 22, but also the image information as read out of the frame memory 72a. In accordance with these two kinds of image information, the unit 76 calculates image processing conditions (setup conditions) that are optimal for the image of interest and controls the display control unit 78 on the basis of the result of the calculation.

The display control unit 78 receives the image information as read out of the frame memory 72a and a command signal from the setup calculation and storage unit 76 and reproduces on the display 80 a simulated image that corresponds to a finished print under the calculated setup conditions.

The operator checks the quality of the image as seen on the display 80. If the image is acceptable, the operator depresses the START key; if not, the operator depresses the CORRECT key and manipulates the COLOR CORRECT key and/or GRADATION CORRECT key to enter a command for color and/or gradation correction into the input unit 82.

The setup calculation and storage unit 76 controls the display control unit 78 in accordance with the entered command for color and/or gradation correction. The display control unit 78 will accordingly produce another simulated image on the display 80. This procedure is repeated until the quality of the image that is reproduced on the display 80 is found to be acceptable.

If, as a result of this procedure, the quality of the displayed image is found to be acceptable, following the operator depressing the START key on the input unit 82, the setup calculation and storage unit 76 supplies the color correction unit 84 and the gradation correction unit 86 with the associated color and gradation correction signals in accordance with the verified setup conditions.

At the same time, the second selector 74 connects the frame memory 72a to the color correction unit 84, and the image information as read out of the frame memory 72a is transferred to the image forming apparatus 16 after it is subjected to s color/gradation correction by the color correction unit 84 and the gradation correction unit 86 in accordance with the setup conditions.

The second selector 74 also connects the frame memory 72b to both the setup calculation and storage unit 76 and the display control unit 78, and the image stored in the frame memory 72b is checked for quality in the same manner as described above.

The outputs from various points in the setup apparatus 14 such as the setup calculation and storage unit 76, the display control unit 78, the color correction unit 84 and the gradation correction unit 86, the outputs from various sites of components that are provided in the image forming apparatus 16 such as a digital/analog converter 92 and an acoustooptical modulator (hereunder abbreviated as "AOM") driver 94, as well as the drive of a polygonal mirror 96 are each controlled by the output timing control unit 90.

In the illustrated case, the setup apparatus 14 has three frame memories 72a, 72b and 72c; however, the number of frame memories that can be used in not limited to three and the setup apparatus 14 may have one or two or even more than three frame memories.

The illustrated digital photoprinter 10 is composed of three basic parts, the image reading apparatus 12, setup apparatus 14 and the image forming apparatus 16 and, hence, considering various factors including the processing efficiency and the cost of the printer 10, one may safely assume that the best balance is achieved by using three frame memories as in the illustrated case.

The image forming apparatus 16 exposes the light-sensitive material A by performing optical beam scanning in accordance with the image information as transferred from the setup apparatus 14 and the exposed light-sensitive material A is subjected to development and subsequent processing so that it emerges from the apparatus 16 as a finished print P. Performing these functions, the image forming apparatus 16 has the D/A converter 92, the AOM driver 94, an image exposing unit 98 and a developing unit 100.

The image information as produced from the setup apparatus 14 is converted to analog image information by the D/A converter 92 and thereafter transferred to the AOM driver 94. The AOM driver 94 drives an AOM assembly 104 (see FIG. 6) in the image exposing unit 98 in such a way as to perform optical beam modulation in accordance with the transferred image information.

The image exposing unit 98 exposes the light-sensitive material A by optical beam scanning (raster scanning) and records images on the material A in association with the image information of interest. As shown conceptually in FIG. 6, the image exposing unit 98 has a light source assembly 102, the AOM assembly 104, a polygonal mirror 96 serving as a light deflector, an fθ lens 106, and a transporting unit 108 for transporting the light-sensitive material A in the slow scan direction. The light source assembly 102 is composed of three light sources 102R, 102G and 102B. The light source 102R emits a light beam of a narrow bandwidth that corresponds to the exposure of the R sensitive layer formed in the light-sensitive material A. Similarly, the light sources 102G and 102B correspond to the exposure of the G and B sensitive layers, respectively, formed in the light-sensitive material A. The AOM assembly 104 is composed of three AOMs 104R, 104G and 104B which modulate the light beams from the respective light sources in accordance with the recorded image.

The light beams emitted from the light source assembly 102 (102R, 102G and 102B) and which travel at mutually different angles are directed to the corresponding members of the AOM assembly 104 (104R, 104G and 104B). The light source assembly 102 may be selected from among various types of light sources capable of emitting light beams at predetermined wavelengths that correspond to the respective light-sensitive layers in the light-sensitive material A, and applicable examples include various types of semiconductor lasers, light-emitting diodes, and gas lasers such as a He—Ne laser. Multiplexing optics which combine the individual light beams into a single beam may also be used as a light source assembly.

The respective AOMs 104 are supplied with R, G and B drive signals r, g and b from the AOM driver 94 that are associated with the recorded image and, in response to these drive signals, the AOMs intensity modulate the incident light beams in accordance with the recorded image.

The light beams modulated with the AOM assembly 104 are incident at generally the same point on the polygonal mirror 96 serving as the optical deflector. They are then reflected and deflected in the fast scan direction (indicated by arrow x). Thereafter, the beams pass through the fθ lens 106 so that they are conditioned to form a focused beam spot of a predetermined shape in a predetermined scan position z, which beam is then incident on the light-sensitive material A.

The optical deflector used as a component of the image exposing unit 98 is not limited to the illustrated polygonal mirror but may be selected from among a resonant scanner, a galvanometer mirror, etc. Needless to say, the image exposing unit 98 may optionally be equipped with a light beam shaping means or tilting correction optics.

The light-sensitive material A is rolled about itself and loaded in a predetermined position as it is shielded from light. This light-sensitive material A is withdrawn by a suitable means such as withdrawing rollers and cut to a predetermined length (not shown). Thereafter, roller pairs 108a and 108b that are disposed across the scan position z and which compose the slow scan unit 108 will hold the light-sensitive material A as it is transported in the slow scan direction (indicated by arrow y), which is generally perpendicular to the above-defined fast scan direction.

As already mentioned, the light beams are deflected in the fast scan direction. Hence, the light-sensitive material A as it is transported in the slow scan direction is scanned by the light beams in two-dimensional over the entire surface, whereby the image associated with the image information as transferred from the setup apparatus 14 is recorded on the light-sensitive material A.

The exposed light-sensitive material A is then transported by a roller pair 110 into the developing unit 100, where it is subjected to development and subsequent processing as a finished print P.

It should be mentioned that if the light-sensitive material A is a silver halide photographic material, the developing unit 100 is typically composed of a color developing tank 112, a bleach-fixing tank 114, washing tanks 116a, 116b and 116c, a drying zone 118, etc., and the light-sensitive material A is given predetermined treatments in the respective processing tanks, and emerging therefrom as the finished print P.

Figure 7:
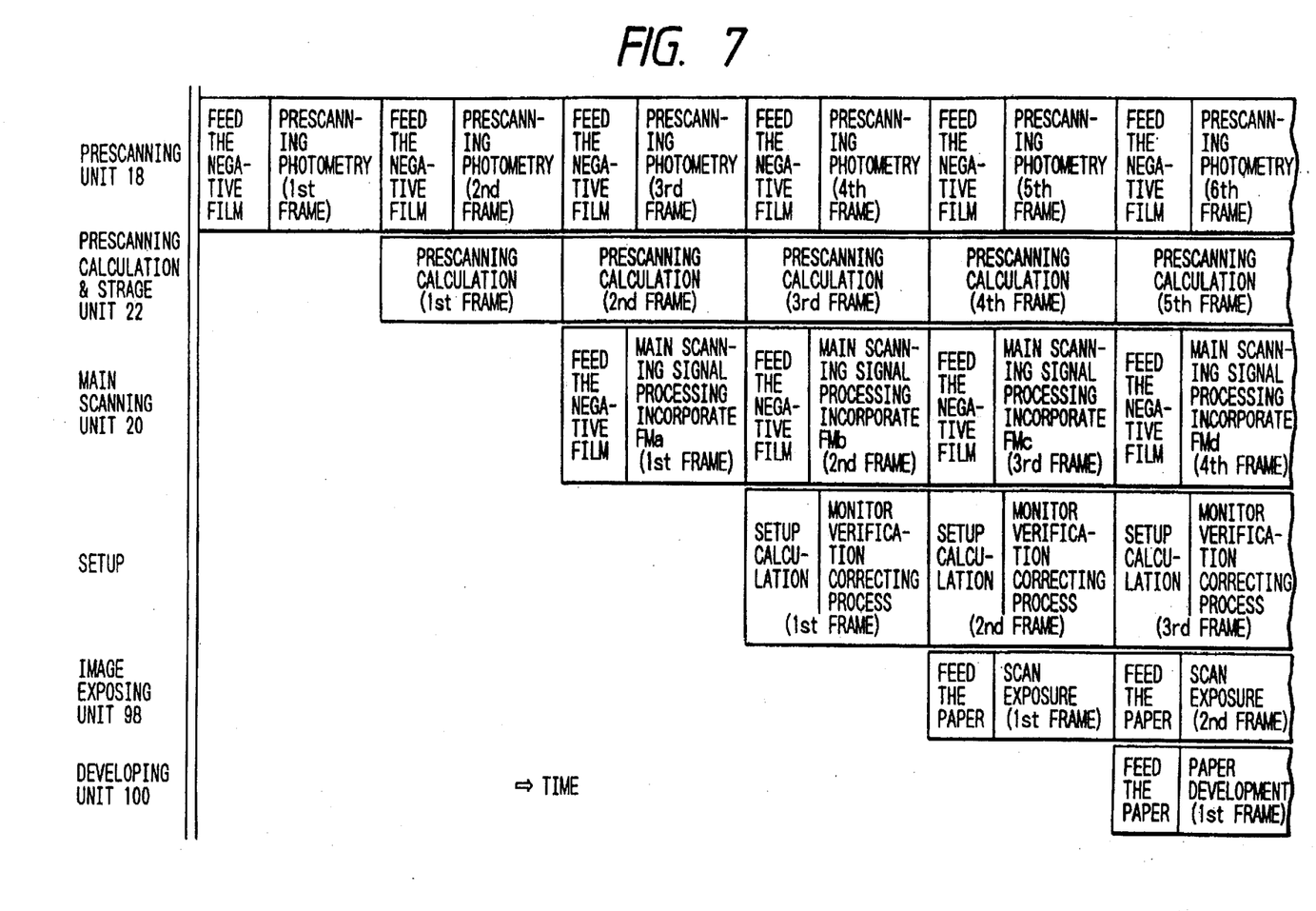
FIG. 7 is a timing chart showing the operational timing of the digital photoprinter shown in FIG. 1.

FIG. 7 is a timing chart that shows conceptually the operational timing of the digital photoprinter 10 which has been described above. In the illustrated case, the printer is adapted so that incident light beams are modulated with the AOM assembly 104, but the present invention is not so limited, and any other light sources that are directly tunable as exemplified by laser diodes may be employed to modulate light beams in accordance with the recorded image.

The slow scan transport means also is not limited to the two roller pairs which are disposed across the scan position and an exposure drum that holds the light-sensitive material in the scan position may be combined with two nip rollers that are disposed across the scan position.

In the illustrated case, optical beam scanning is employed, but this may be replaced by a "drum scanner" in which the light-sensitive material is wound onto a drum and in which light beams are permitted to be incident at one point on the drum which is rotated as the beams are moved along the longitudinal axis of the drum.

Other approaches that can be used in place of optical beam scanning include area exposure which uses a surface light source and a liquid-crystal shutter, as well as exposure that uses a linear light source such as a light-emitting diode array. Alternatively, an image output may be produced on a display such as a CRT without outputting the image on the light-sensitive material.

While the image reading apparatus of the present invention has been described above in detail, it should be understood that the present invention is in no way limited to the illustrated cases alone and that various improvements and modifications may of course be made without departing from the spirit and scope of the invention.

As described in detail above, the image reading apparatus of the present invention offers many advantages. According to the first embodiment, not only the optical filters and lens opening for adjusting the quantity of light but also the means for adjusting these optical components can be eliminated, and hence one can realize an image reading apparatus that is simple in system configuration and which is less costly. In addition, rapid and efficient image reading operations can be achieved, particularly with negative films and the like for pictorial photography, and considerable reduction in processing time can be accomplished.

In the second embodiment of the invention, rapid and efficient image reading operations can also be achieved without increasing the complexity in the drive mechanism for the photoelectric transducer means and, hence, one can realize an image reading apparatus that is simple in system configuration and which is less costly.

In the third embodiment of the invention, a transmission-type original need be moved in only one direction, and hence the movement of the original and the device for transporting it can be greatly simplified. Particularly in the case of reading images from a continuous series of transmission-type originals as in a roll of film, prescanning and main scanning operations can be performed continuously to achieve the reading of successive originals with an extremely high efficiency.

What is claimed is:

1. An image reading apparatus comprising:

a light source for illuminating a transmission-type original with reading light from said light source and which carries image information;

photoelectric transducer means for reading said image information a necessary number of times in accordance with image density information on said transmission-type original;

at least one memory for storing the image information as read by said photoelectric transducer means; and image input means for entering said image information sequentially into said memory in accordance with image density information on said transmission-type original, wherein image information having the necessary amount of light is produced on the basis of the image information as stored and held in said memory.

* * * * *